US008861603B2

(12) United States Patent
Lertrattanapanich et al.

(10) Patent No.: US 8,861,603 B2
(45) Date of Patent: Oct. 14, 2014

(54) SYSTEM AND METHOD FOR MOTION VECTOR COLLECTION BASED ON K-MEANS CLUSTERING FOR MOTION COMPENSATED INTERPOLATION OF DIGITAL VIDEO

(75) Inventors: Surapong Lertrattanapanich, Irvine, CA (US); Yeong-Taeg Kim, Irvine, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 1640 days.

(21) Appl. No.: 11/846,468

(22) Filed: Aug. 28, 2007

(65) Prior Publication Data

US 2009/0060042 A1    Mar. 5, 2009

(51) Int. Cl.
H04N 7/12        (2006.01)
H04N 11/02       (2006.01)
H04N 11/04       (2006.01)
H04N 19/577      (2014.01)
H04N 19/583      (2014.01)
H04N 19/587      (2014.01)
H04N 19/51       (2014.01)

(52) U.S. Cl.
CPC ... H04N 19/00733 (2013.01); H04N 19/00721 (2013.01); H04N 19/00751 (2013.01); H04N 19/00684 (2013.01)
USPC .................................................. 375/240.16

(58) Field of Classification Search
USPC ................................................... 375/240.16
See application file for complete search history.

(56) References Cited

U.S. PATENT DOCUMENTS

| 4,794,455 | A  | * | 12/1988 | Ericsson ............... | 375/240.14 |
| 4,890,160 | A  |   | 12/1989 | Thomas |  |
| 5,777,682 | A  |   | 7/1998  | De Haan et al. |  |
| 7,039,109 | B2 |   | 5/2006  | Pelagotti et al. |  |
| 7,095,786 | B1 | * | 8/2006  | Schonfeld et al. ....... | 375/240.16 |

(Continued)

FOREIGN PATENT DOCUMENTS

GB        2188510         9/1987

OTHER PUBLICATIONS

A System for Learning Statistical Motion Patterns; Weiming Hu, Xuejuan Xiao, Zhouyu Fu, Dan Xie, Tieniu Tan, Fellow, IEEE, and Steve Maybank, Member, IEEE; IEEE Transactions on Pattern Analysis and Machine Intelligence, vol. 28, No. 9, Sep. 2006.*

(Continued)

*Primary Examiner* — Luu Pham
*Assistant Examiner* — James Turchen
(74) *Attorney, Agent, or Firm* — IP Investment Law Group (57) ABSTRACT

A system and method of collection motion vectors for motion compensated interpolation of digital video are disclosed. For example, one embodiment includes a method of identifying motion vectors for interpolating a portion of a digital video signal. The method comprises identifying a plurality of motion vectors indicative of differences between first and second frames of a digital video signal, assigning each of the plurality of motion vectors to one of a plurality of clusters, selecting at least one motion vector assigned to each of the plurality of clusters, and generating at least a portion of a third frame based on the at least one motion vector selected for each of the plurality of clusters. Other embodiments include a system and device configured to perform the method.

25 Claims, 6 Drawing Sheets

(56) References Cited

U.S. PATENT DOCUMENTS

| | | | |
|---|---|---|---|
| 7,142,600 B1* | 11/2006 | Schonfeld et al. | 375/240.16 |
| 7,667,778 B2* | 2/2010 | Yoshiwara | 348/699 |
| 7,840,068 B2* | 11/2010 | Knee et al. | 382/173 |
| 2004/0091047 A1* | 5/2004 | Paniconi et al. | 375/240.16 |
| 2005/0207491 A1* | 9/2005 | Zhang et al. | 375/240.16 |
| 2006/0262853 A1* | 11/2006 | Li et al. | 375/240.16 |
| 2007/0140346 A1* | 6/2007 | Chen et al. | 375/240.16 |
| 2008/0025403 A1* | 1/2008 | Sato et al. | 375/240.16 |
| 2009/0060041 A1 | 3/2009 | Lertrattanapanich et al. | |

OTHER PUBLICATIONS

Motion-Compensated Frame Interpolation Using Bilateral Motion Estimation and Adaptive Overlapped Block Motion Compensation; Byeong-Doo Choi et al.; IEEE Transactions on Circuits and Systems for Video Technology, vol. 17, No. 4, Apr. 2007.*

Motion Magnification; Ce Liu et al.; Computer Science and Articial Intelligence Lab (CSAIL); Massachusetts Institute of Technology; SIGGRAPH2005; 2005.*

\* cited by examiner

SYSTEM AND METHOD FOR MOTION VECTOR COLLECTION BASED ON K-MEANS CLUSTERING FOR MOTION COMPENSATED INTERPOLATION OF DIGITAL VIDEO

BACKGROUND OF THE INVENTION

1. Field of the Invention

This application relates to frame interpolation in digital video. In particular, this application relates to systems and methods for determining motion vectors for motion compensated interpolation.

2. Description of the Related Technology

In recent years, advancements in digital video processing have allowed video display manufacturers to produce systems which provide a more realistic viewing experience by enhancing raw digital video. For example, one way of enhancing video materials is to increase the displayed frame rate by generating and displaying frames that are interpolated based on the content of previous and/or succeeding frames. For example, filmed video from sources such as motion pictures typically includes 24 frames per second (fps). Video devices often have refresh or display rates of 50 or 60 frames per second. One well known way to render 24 fps video at 60 fps is to repeat every 4th frame in a 2-3 pattern for progressive video or a 3:2 pulldown process that repeats fields of frames in a 3:2 pattern to produce an interlaced 60 fps video signal. In either case, the 3:2 pattern can result in jerky or jittery video that is particularly apparent during slow, steady camera movements. This artifact is commonly referred to as telecine judder. A way of enhancing display of 24 fps video is to interpolate frames to reach 60 fps rather than simply repeating frames to reduce or eliminate such judder. In addition, display or other video processing devices may utilize frame interpolation in other frame rate conversion applications or to interpolate frames of a video signal lost to signal or other noise.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved video quality and reduced visible artifacts in digital video data.

One embodiment includes a method of identifying motion vectors for interpolating a portion of a digital video signal. The method comprises identifying a plurality of motion vectors indicative of differences between first and second frames of a digital video signal, assigning each of the plurality of motion vectors to one of a plurality of clusters, selecting at least one motion vector assigned to each of the plurality of clusters, and generating at least a portion of a third frame based on the at least one motion vector selected for each of the plurality of clusters.

One embodiment includes a system for identifying motion vectors for interpolating a portion of a digital video signal. The system comprises means for storing a plurality of motion vectors indicative of differences between first and second frames of a digital video signals. The system further includes means for processing the digital video signal. The processing means is configured to assign each of the plurality of motion vectors to one of a plurality of clusters, select at least one motion vector assigned to each of the plurality of clusters, and generate at least a portion of a third frame based on the at least one motion vector selected for each of the plurality of clusters.

One embodiment includes a system for identifying motion vectors for interpolating a portion of a digital video signal. The system comprises a memory configured to store a plurality of motion vectors indicative of differences between first and second frames of a digital video signal. The system further comprises a processor configured to assign each of the plurality of motion vectors to one of a plurality of clusters, select at least one motion vector assigned to each of the plurality of clusters, and generate at least a portion of a third frame based on the at least one motion vector selected for each of the plurality of clusters.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

A video signal may be described in terms of a sequence of pictures, which include frames (an entire picture), or fields (e.g., an interlaced video stream comprises fields of alternating odd or even lines of a picture). As used herein, the term "frame" is broadly used to refer to a picture, a frame, or a field. Multimedia processors, such as video processors, may operate on a frame by partitioning it into blocks or "macroblocks" of, for example, 16×16 pixels. The processor may further partition each block into subblocks. Each subblock may further comprise additional subblocks. For example, subblocks of a block may include 16×8 and 8×16 subblocks. Subblocks of the 8×16 subblocks may include 8×8 subblocks, and so forth. As used herein, the term "block" refers to either a block or a subblock.

Video processors may take advantage of temporal redundancy in video data by representing a frame in terms of the difference between the frame and one or more reference frames. For example, video processors may use motion compensation based algorithms that match blocks of a source frame to portions of one or more other frames. The block of the source frame may be shifted in the frame relative to the matching portion of the reference frame. This shift is characterized by a motion vector. Any differences between the block and partially matching portion of the reference frame may optionally be characterized in terms of a residual. The video processor may thus represent a frame as data that comprises one or more of the motion vectors and residuals for a particular partitioning of the frame.

Such motion based representation of frames are often used to encode video data. Such representations can also be used to interpolate frames between frames of video data. Such motion compensated interpolation (MCI) systems may use a pair of two consecutive frames {PRE, CUR} in a motion video signal and an estimated motion vector field (MVF) describing the motion vectors relative to the two frames. The motion vectors are used to interpolate blocks of one or more frames between the PRE and CUR frames. The interpolated frame is then stored and/or output for further processing or display.

Figure 1:
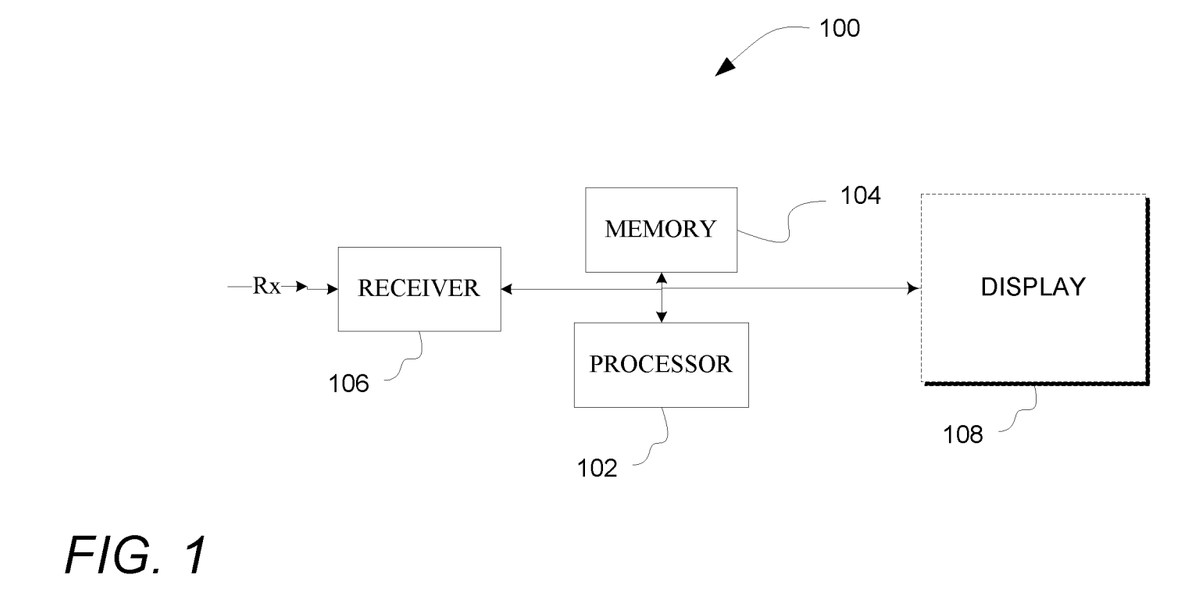
FIG. 1 is a block diagram illustrating components of an apparatus configured to process received video signals.

FIG. 1 is a block diagram illustrating components of an apparatus 100 configured to process received video signals. Such video processing may include interpolating frames of video data. The apparatus 100 may be embodied as a video display, a digital video player and/or recorder, a stand-alone video processor or receiver, or any other suitable device or system that is configured to receive video signals, and process or the received display video signals, including mobile or handheld devices. The apparatus includes a processor 102, a memory 104, and a video receiver 106. The process 102 may include one or more of a general purpose processor and digital signal processor. The memory 104 may include volatile and non-volatile storage such as RAM, flash memory, disk storage, or any other storage medium suitable for storing digital video and processing related data. The receiver 106 includes any suitable apparatus for receiving digital video data including, for example, an ATSC or QAM television receiver, a component or HDMI receiver, a network receiver such as a cable modem, Ethernet or any other suitable data network receiver. The system 100 may optionally include, or be in communication with, a display 108 configured to display the digital video.

Figure 2:
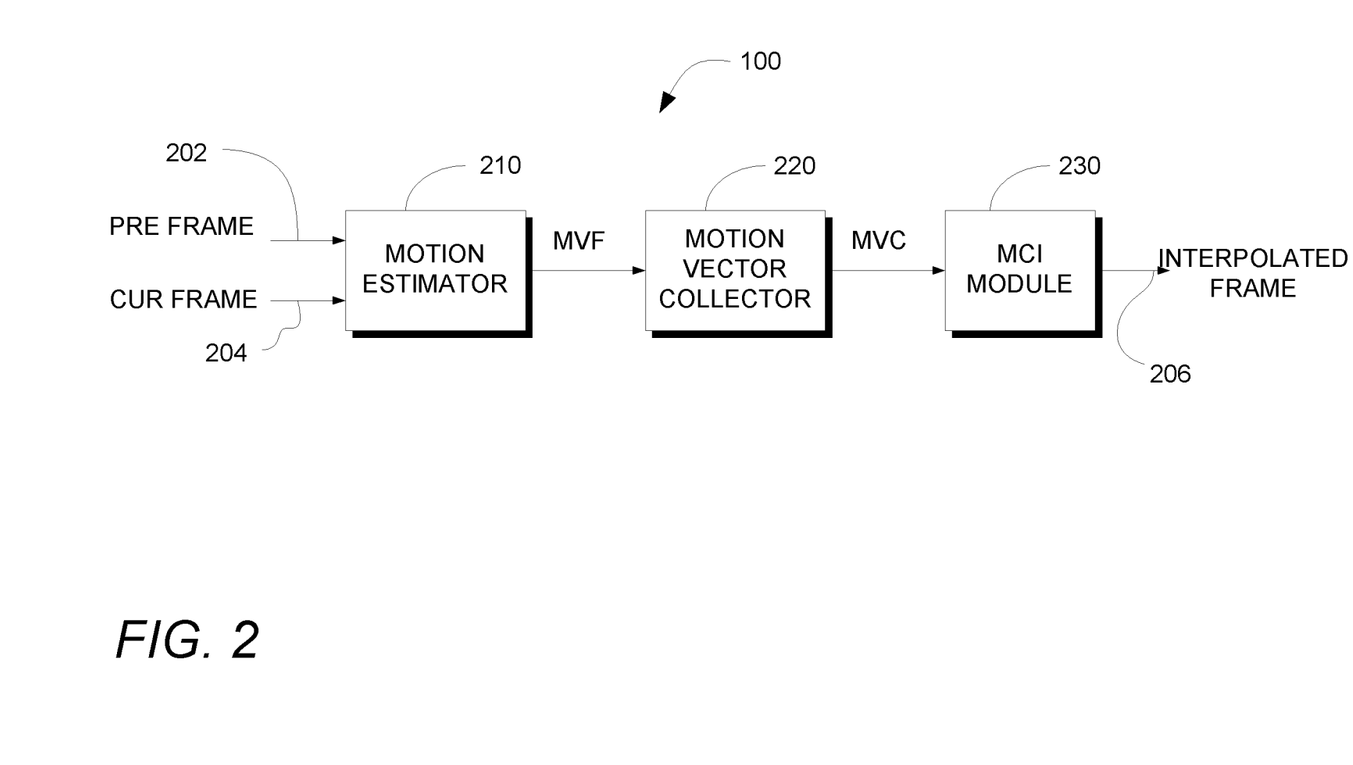
FIG. 2 is a block diagram illustrating one embodiment of an apparatus for interpolating digital video data.

FIG. 2 is a block diagram illustrating one embodiment of the apparatus 100 that is configured to interpolate digital video data. A motion estimator 210 receives two frames, e.g., consecutive frames labeled PRE (previous) 202, e.g., corresponding to a time t in the motion video signal, and CUR (current) 204, corresponding to a time t+1 in the motion video signal. The motion estimator 210 uses the frames 202 and 204 to estimate a motion vector field (MVF) that describes changes or motion in blocks of data between the frame 202 and the frame 204. The motion estimator 210 may use any suitable method of motion estimation, including those known in the art. A motion vector collector 220 receives the MVF and collects motion vectors to define a motion vector collection (MVC) for interpolation of blocks in the interpolated frame. The motion compensated interpolation (MCI) module 230 uses the MVC and other data such as the PRE frame 202 and CUR frame 204 to generate an interpolated frame 206 at a time t+α. The MCI module 230 may use any suitable method of interpolation based on the MVC, including methods known in the art.

It has been found that the MCI module 230 obtains better results for interpolated frames (e.g., frames having fewer interpolation artifacts) if two or more motion vectors per block are used to better handle occlusion. (Conceptually, occlusion occurs when there are multiple objects in the frame 202 moving through a block of interest (BOI) (e.g., a particular block being interpolated in the frame 206) with different speeds or direction when projected to the time t+α.) Mathematically, the interpolation performed by the MCI module 230 may be represented in terms of a set or collection of K motion vectors V={$v_1, v_2, \ldots, v_K$}, two consecutive frames PRE I(x,y,t) and CUR I(x,y,t+1) provided to the MCI module 230. Specifically, the MCI result I(x,y,t+α) at coordinate (x, y) in the interpolated frame 206 and time instant t+α may be calculated based on the below relation:

$$I(x, y, t+\alpha) = \frac{\sum_{k=1}^{K} w_k \left[ \begin{array}{l} \beta \cdot I(x - \alpha \cdot v_x^k, y - \alpha \cdot v_y^k, t) + \\ \alpha \cdot I(x + \beta \cdot v_x^k, y + \beta \cdot v_y^k, t+1) \end{array} \right]}{\sum_{k=1}^{K} w_k}, \quad (1)$$

where $0 \leq \alpha < 1$, $\beta = 1 - \alpha$ and $w_k$ is a reliability associated with motion vector $v_k = [v_x^k \ v_y^k]$. The reliability $w_k$ of a motion vector $v_k$ may be estimated using any suitable method, including, for example, based on the sum of absolute difference (SAD) between a group of pixels (GOP) centered about locations associated with the motion vector $v_k$ in the PRE and CUR frames. The SAD represents the similarity between those two GOPs. Once the SAD is obtained, the weight $w_k$ may be computed as the inverse proportion to the SAD result. That is, the more similar between GOPs, the higher weight.

As is apparent from Equation 1, the quality of such interpolation may depend on the selection of the motion vector collection used by the MCI module 230. Accordingly, one embodiment includes a method of motion vector collection, such as for use in the motion vector collector 220 that identifies clusters of motion vectors and selects particular motion vectors for each cluster. Thus, an initial candidate set of motion vectors (e.g., motion vectors that are near the BOI in the PRE frame 202) is reduced to a relative few motion vectors (e.g., one from each cluster). For example, in one embodiment, motion vectors are clustered using a K-means algorithm in which a specified number ("k") of clusters are identified from a candidate set of motion vectors.

Figure 3:
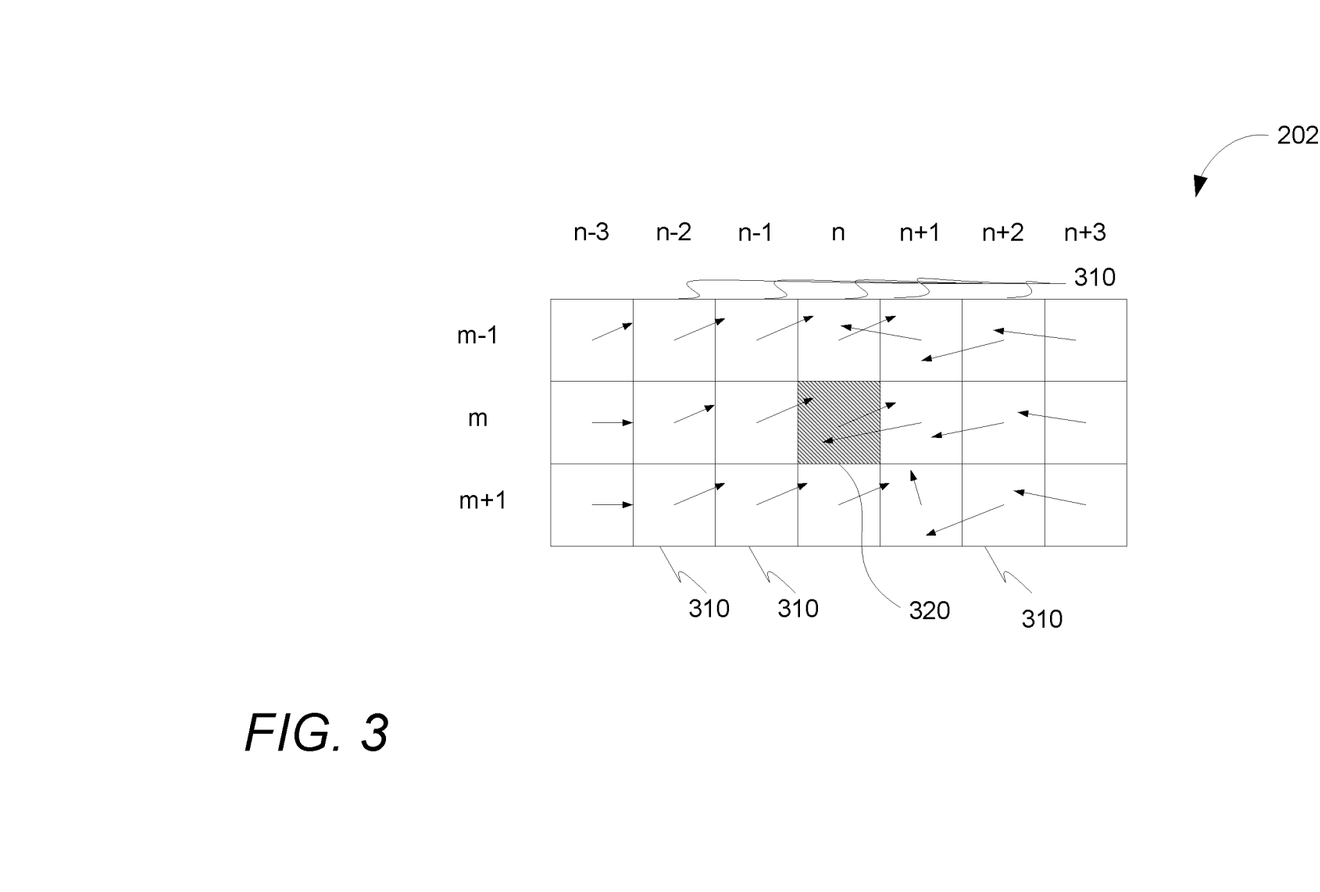
FIG. 3 is a diagram illustrating motion vector data of a frame of video data.

FIG. 3 is a diagram illustrating motion vectors 310 data of blocks of the PRE frame 202 (with, for example, the motion being with reference to the CUR frame 204). The blocks, and their corresponding motion vectors 310 are arranged in rows n and columns m. However, other arrangements may be used, including block partitions that change dynamically from frame to frame. The motion vector associated with each block defines a two-dimensional motion is illustrated coming out of the page at the viewer. For illustration purposes, a block of interest (BOI) 320 is indicated at row n and column m with darker hatching in that particular block. In one embodiment, each of the N=15 motion vectors 310 (selected from spatially proximal blocks such as neighboring blocks of columns n−3 to n+3 in adjacent rows (m−1 to m+1)) comprises the candidate set for the clustering by the motion vector collector 220. Other embodiments may use other ways of selecting the candidate set, including selecting motion vectors from different numbers of neighbors, e.g., 5 or 9 neighbors.

Figure 4:
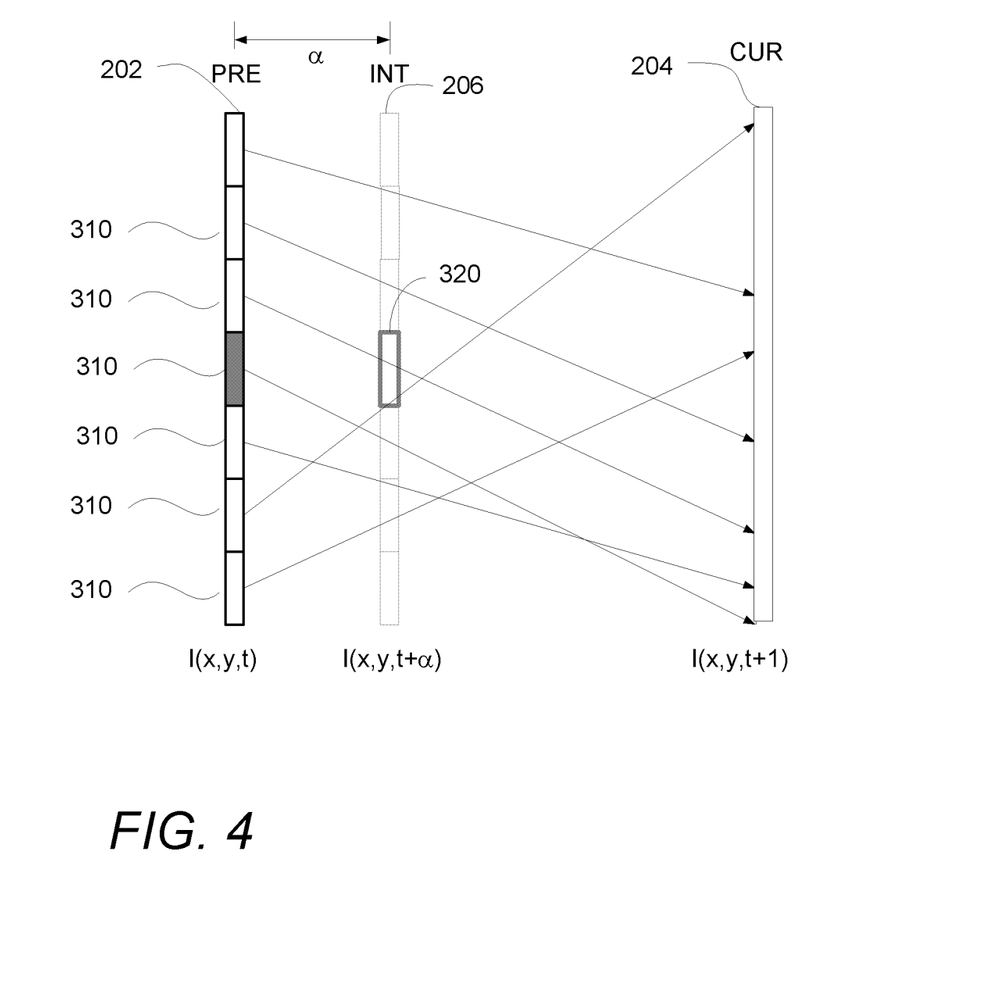
FIG. 4 is a series of one dimensional diagrams illustrating the vertical location of motion vectors within two frames at times t and t+1 and in an interpolated frame at time t+$\alpha$.

FIG. 4 is a series of one dimensional diagrams illustrating the vertical location of motion vectors within the PRE frame 202 at time t, the CUR frame 204 at time t+1, and in the interpolated frame 206 at time t+α. Note that α may be selected to achieve a desired pacing of frames and may thus vary from one interpolated frame to the next. Moreover, more than one frame 206 may be interpolated between particular frames 202 and 204. As illustrated, the motion vectors 310, which correspond to blocks of the PRE frame 202, may be derived based on matching the blocks of the PRE frame 202 with portions of the CUR frame 204 at time t+1 (note that the portions of the CUR frame 204 that match the blocks 202 from the PRE frame may not align with the blocks of the CUR frame 204, may overlap with each other, and may not correspond or cover all portions of the CUR frame 204). As noted above, the PRE frame 202 may be represented by I(x,y,t), the CUR frame 204 may be represented by, I(x,y,t+1) and the interpolated frame 206 may be represented by I(x,y,t+α) in equation 1. One embodiment includes a way to obtain a set of motion vectors $V=\{v_1, v_2, \ldots, v_K\}$ from the candidate set (CS) of motion vectors 310 collected from blocks spatially proximate to the BOI 320 that may be used to interpolate the BOI 320 of the frame 206.

Figure 5:
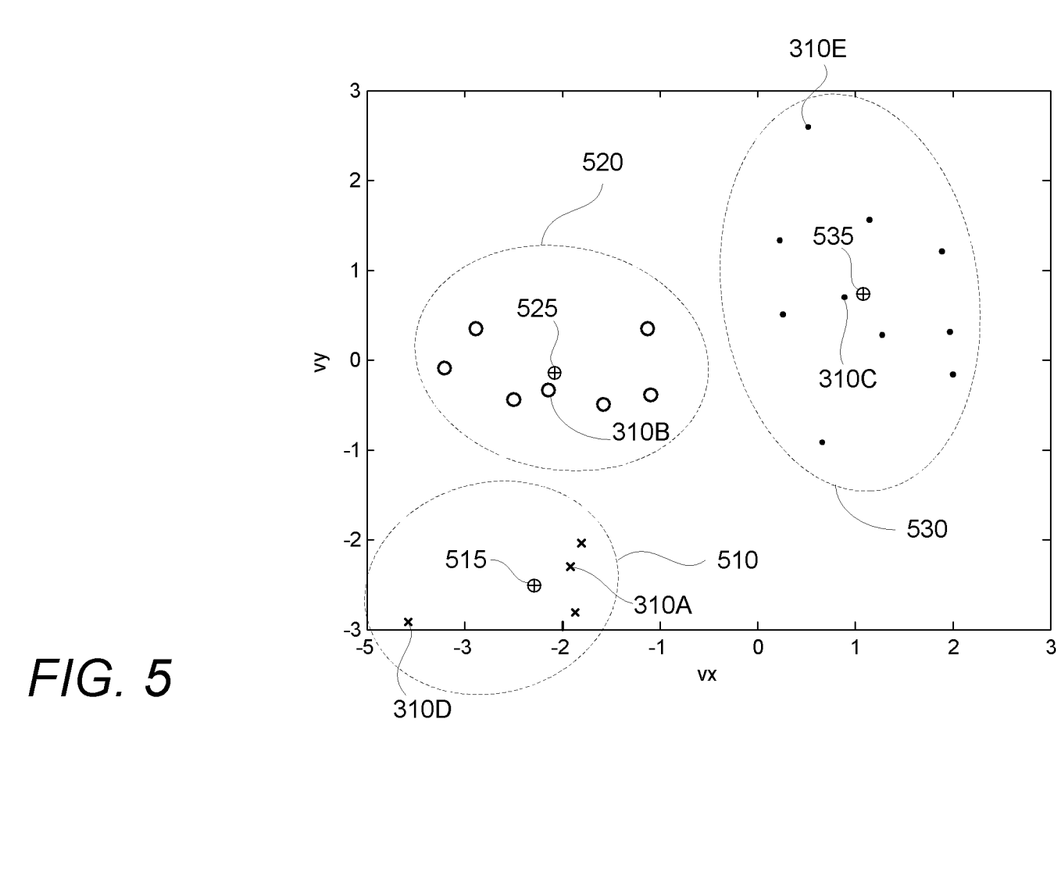
FIG. 5 is a graphical illustration of clusters of motion vectors according to one embodiment.

FIG. 5 is a graphical illustration of clusters of motion vectors according to one embodiment of a method of collection motion vectors for interpolating blocks of the frame 206. Each motion vector $v_i=[v_x^i \; v_y^i] \in CS$ comprises two components along horizontal and vertical axes, which can be represented by coordinates in the 2-D plane as illustrated in FIG. 5. FIG. 5 illustrates a plot of N=21 motion vectors 310 selected from around the block of interest 320. Each vector $v_i \in CS$ is denoted in FIG. 5 by symbols x,•, and ○. FIG. 5 illustrates the vectors 310 assigned to K=3 example clusters 510, 520, and 530. The cluster 510 contains $v_i \in CS$ such that its locations is denoted by symbol x. The cluster 510 has a centroid vector 515 is defined by a mean in each direction (horizontal and vertical) of the motion vectors 310 within the cluster and it is denoted by symbol ⊕. The motion vectors 310 of the clusters 520 and 530 are each similarly denoted by the symbols ○, and •, respectively. The clusters 520 and 530 have corresponding centroids 525 and 535. Once a final clustering is determined, as described in more detail with reference to FIG. 6, the set or collection of motion vectors, $V=\{v_1, v_2, \ldots, v_K\}$, is collected by selecting a motion vector from each cluster 510, 520, and 530. In one embodiment, the closest motion vectors 310A, 310B, and 310C to the respective centroids 510, 520, and 530 are selected for each of the example clusters 510, 520, and 530 to define the set V.

Figure 6:
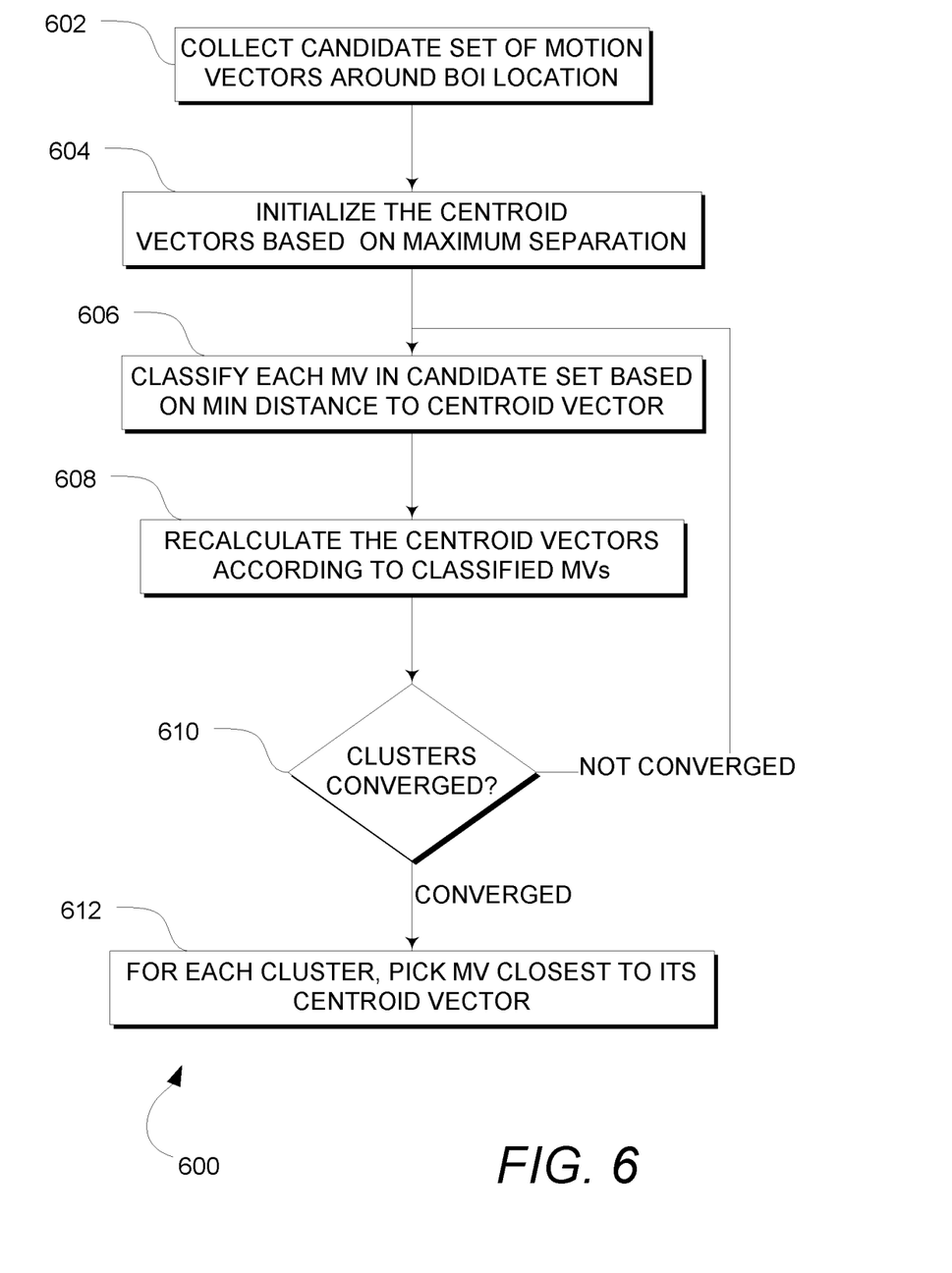
FIG. 6 a flowchart illustrating one embodiment of a method of selecting vectors for interpolating a frame.

FIG. 6 a flowchart illustrating one embodiment of a method 600 of selecting vectors for interpolating the frame. The method 600 includes identifying K motion vector clusters and selecting motion vectors from the K clusters, e.g., using "K-means" clustering process. In one embodiment, the value of K matches the number of input vectors that the MCI module 230 is configured to receive and use for interpolating the frame 206. The value of K may be selected based on the maximum number of the moving objects within the BOI. Based on extensive investigation, it has been found that K=3 motion vectors are sufficient for general moving video signals. However, other embodiments may use any suitable number for K, e.g., a value of K in the range of 1-5 or 1-10. For convenience in describing the method 600, the example value of K=3 clusters of motion vector is used to illustrate examples herein.

The method 600 begins at a block begins at a block 602 in which the processor 102 collects a candidate set $CS=\{v_1, v_2, \ldots, v_N\}$ of motion vectors (from the motion vector field from the PRE frame 102 to the CUR frame 104). In one embodiment, the candidate set is set to include motion vectors from blocks adjacent to the BOI 220. For example, the candidate set may be initialized to motion vectors from N=21 adjacent blocks 210 as illustrated with reference to FIG. 3. In other embodiments, N may include, for example, 9 or 5 spatially proximate blocks. A collection V, a set of selected motion vectors for interpolating the BOI 220, is also initialized to the empty set.

Next at a block 604, the processor 102 initializes the set of K (e.g., K=3) centroid vectors $C=\{c_1, c_2, c_3\}$ associated with initial clusters, such as clusters 510, 520, and 530 of FIG. 5, based on maximum separation. For example, the processor 102 may select any two centroid motion vectors $c_1 \in CS$ and $c_2 \in CS$ such that the separation between them has maximum distance $DIST(c_1,c_2)$. An example of the distance function $DIST(c_1,c_2)$ that may be used is the city-block distance (1-norm) which is defined by $DIST(c_1,c_2)=|c_x^1-c_x^2|+|c_y^1-c_y^2|$. Other distance metrics such as Euclidean distance (2-norm) or higher norm (L-norm, L>2) metric may also be used. In FIG. 5, the illustrated vectors 310D and 310E have a maximum separation based on city-block distance. Thus, according to one embodiment, the vectors 310D and 310E may be selected as two initial centroid vectors. Additional initial centroid vectors may be selected by, for example, averaging between selected vectors 310E and 310D. For example, where K=3 such that one additional initial vector $c_3$ is used, the vector $c_3$ may be selected such that $c_3=(c_1+c_2)/2$.

Moving to a block 606, for each $v_i \in CS$, the processor 102 classifies the vector $v_i$ into a cluster, e.g., based a minimum distance criterion. For example, $v_i$ is assigned to a cluster j if $DIST(v_i,c_j)$ is the minimum distance among other clusters $k \ne j$. Proceeding to a block 608, the processor 102 updates each centroid vector $c_k$, e.g., k=1, 2, and 3, by calculating the mean of the motion vectors assigned to the k th cluster in the block 606.

Next at a block 610, the processor 102 determines whether or not the identified clusters have converged. For example, the convergence criterion may be to test if the sum of the difference between the centroid of each cluster $c_k$, e.g., k=1, 2, and 3, calculated at the current iteration of the block 608 and the corresponding centroids calculated in a previous iteration of the block 608 is less than a predetermined threshold. If the difference is greater than the threshold, the method 600 proceeds to the block 606 for another iteration of the blocks 608-610. If the difference in the centroids is less than the threshold, the method 400 proceeds to a block 612. At the block 612, for each cluster, e.g., k=1, 2, and 3, the processor 102 selects the motion vector within k th cluster which is nearest to its centroid vector $c_k$ and add s the selected motion vector to the motion vector collection V. For example, if the graphical illustration of clusters of FIG. 5 were of a converged set of centroids, the motion vectors 310A, 310B, and 310C are, respectively, closest to the centroid vectors 515, 525, and 535 of clusters 510, 520, and 530. Therefore, in this example, the motion vectors 310A, 310B, and 310C are stored to the motion vector collection V, e.g., in the memory 104. The motion vector collection V may then be provided to the MCI module 230 to produce the interpolated frame 206.

It is to be recognized that the foregoing description of one embodiment of the method 600 illustrates operation for a particular BOI 220 at block m, n. In one embodiment, the method 600 is repeated for each block of the interpolated frame 106. As noted above, a different number, k, of clusters may be used. In addition, more than one motion vector for each cluster may optionally be selected, e.g., the closest two motion vectors to the centroid of each cluster. The selected motion vectors for each BOI 220 may then be used by the MCI module 230 to interpolate the BOI 220 in the INT frame 106, e.g., based on equation 1. In one embodiment, the MCI module 230 may be provided additional information such as the cluster size, e.g., the number of vectors in each cluster, so that the weight $w_k$ of equation 1 may be adjusted based on the number of vectors in the cluster, e.g., based on the relative number of vectors in each cluster.

In view of the above, one will appreciate that the invention overcomes the problem of collecting motion vectors for motion compensated interpolation. For example according to one embodiment, a fixed, predetermined number of motion vectors (e.g., three motion vectors) is selected for each BOI based on a motion vectors from a predetermined number of clusters. The MCI module 230 in such an embodiment with the predetermined number of motion vectors per BOI has a reduced complexity (versus MCI using a larger, varying, number of motion vectors per BOI) and thus can be more easily (e.g., with lower cost) implemented in a hardware circuit. Moreover, in practice, the motion vector field may be contaminated with spurious vectors that are artifacts of the motion estimation process at the motion estimator 210. Because motion vectors from a centroid of a cluster are used according to one embodiment, such spurious vectors are less likely to be selected for use in interpolation.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of identifying motion vectors for interpolating a portion of a digital video signal, the method comprising:
   identifying a plurality of motion vectors indicative of differences between first and second frames of a digital video signal;
   assigning each of the plurality of motion vectors to one of a plurality of clusters, the clusters having a mean of the motion vectors assigned to a centroid based on a maximum distance;
   selecting at least one motion vector assigned to each of the plurality of clusters based on the at least one motion vector closest to the centroid; and
   generating at least a portion of a third frame, $I(x,y,t+\alpha)$ at a time instant $\alpha$ between the first frame and the second frame, based on the at least one motion vector selected for each of the plurality of clusters and according to:

$$I(x, y, t+\alpha) = \frac{\sum_{k=1}^{K} w_k [\beta \cdot I(x - \alpha \cdot v_x^k, y - \alpha \cdot v_y^k, t) + \alpha \cdot I(x + \beta \cdot v_x^k, y + \beta \cdot v_y^k, t+1)]}{\sum_{k=1}^{K} w_k}$$

wherein $0 \leq \alpha < 1, \beta = 1 - \alpha$, and $w_k$ is a reliability associated with for a set k motion vectors.

2. The method of claim 1, further comprising:
   outputting the frames in an output digital video signal, wherein the third frame is output between the first and second frames, and
   displaying the third frame between the first and second frames.

3. The method of claim 1, wherein identifying the plurality of motion vectors comprises identifying motion vectors associated with portions of the first frame spatially proximal to a portion of the first frame corresponding to the generated portion of the third frame.

4. The method of claim 1, wherein assigning each of the plurality of motion vectors to one of the plurality of clusters comprises iteratively assigning each of the plurality of motion vectors to one of the plurality of clusters.

5. The method of claim 4, wherein iteratively assigning each of the plurality of motion vectors to one of the plurality of clusters comprises:
   assigning each of the plurality of motion vectors to one of the clusters;
   calculating the centroid of each of the clusters; and determining whether the centroid of each cluster has changed from a prior iteration by less than a predetermined threshold.

6. The method of claim 5, wherein assigning each of the plurality of motion vectors to one of the clusters comprises assigning each of the plurality of motion vectors based on a distance to the centroid of each cluster.

7. The method of claim 1, wherein selecting the at least one motion vector assigned to each of the plurality of clusters comprises selecting the at least one motion vector closest to the centroid of each cluster.

8. The method of claim 1, wherein generating the at least a portion of a third frame based on the at least one motion vector selected for each of the plurality of clusters comprises generating a block of the third frame based on the at least one motion vector selected for each of the plurality of clusters.

9. The method of claim 8, wherein generating the at least a portion of a third frame based on the at least one motion vector selected for each of the plurality of clusters comprises generating the at least a portion of the third frame based on a number of motion vectors in each of the plurality of clusters.

10. The method of claim 8, wherein the block comprises a plurality of adjacent pixels of the frame.

11. A system for identifying motion vectors for interpolating a portion of a digital video signal, the device comprising:
a memory configured to store a plurality of motion vectors indicative of differences between first and second frames of a digital video signal; and
a processor configured to:
assign each of the plurality of motion vectors to one of a plurality of clusters, the clusters having a mean of the motion vectors assigned to a centroid based on a maximum distance;
select at least one motion vector assigned to each of the plurality of clusters based on the at least one motion vector closest to the centroid; and
generate at least a portion of a third frame, I(x,y,t+α) at a time instant α between the first frame and the second frame, based on the at least one motion vector selected for each of the plurality of clusters and according to:

$$I(x, y, t + \alpha) = \frac{\sum_{k=1}^{K} w_k [\beta \cdot I(x - \alpha \cdot v_x^k, y - \alpha \cdot v_y^k, t) + \alpha \cdot I(x + \beta \cdot v_x^k, y + \beta \cdot v_y^k, t + 1)]}{\sum_{k=1}^{K} w_k}$$

wherein $0 \leq \alpha < 1$, $\beta = 1 - \alpha$, and $w_k$ is a reliability associated with for a set of k motion vectors.

12. The system of claim 11, further comprising:
a receiver configured to receive the first and second frames, and
a display configured to display the third frame between the first and second frames.

13. The system of claim 11, wherein the processor is configured to identify motion vectors associated with portions of the first frame spatially proximal to a portion of the first frame corresponding to the generated portion of the third frame.

14. The system of claim 11, wherein the processor is configured to iteratively assign each of the plurality of motion vectors to one of the plurality of clusters.

15. The system of claim 14, wherein the processor is configured to:

assign each of the plurality of motion vectors to one of the clusters; calculate the centroid of each of the clusters; and
determine whether the centroid of each cluster has changed from a prior iteration by less than a predetermined threshold.

16. The system of claim 15, wherein the processor is configured to:
assign each of the plurality of motion vectors based on a distance to the centroid of each cluster; and
select the at least one motion vector assigned to each of the plurality of clusters by selecting the at least one motion vector closest to the centroid of each cluster.

17. The system of claim 11, wherein the processor is configured to generate at least one block of the third frame based on the at least one motion vector selected for each of the plurality of clusters.

18. The system of claim 11, wherein the processor is configured to generate the at least a portion of the third frame based on a number of motion vectors in each of the plurality of clusters.

19. A system for identifying motion vectors for interpolating a portion of a digital video signal, the system comprising:
means for storing a plurality of motion vectors indicative of differences between first and second frames of a digital video signal; and
means for processing the digital video signal, the processing means being configured to:
assign each of the plurality of motion vectors to one of a plurality of clusters, the clusters having a mean of the motion vectors assigned to a centroid based on a maximum distance;
select at least one motion vector assigned to each of the plurality of clusters based on the at least one motion vector closest to the centroid; and
generate at least a portion of a third frame, I(x,y,t+α) at a time instant α between the first frame and the second frame, based on the at least one motion vector selected for each of the plurality of clusters and according to:

$$I(x, y, t + \alpha) = \frac{\sum_{k=1}^{K} w_k [\beta \cdot I(x - \alpha \cdot v_x^k, y - \alpha \cdot v_y^k, t) + \alpha \cdot I(x + \beta \cdot v_x^k, y + \beta \cdot v_y^k, t + 1)]}{\sum_{k=1}^{K} w_k}$$

wherein $0 \leq \alpha < 1$, $\beta = 1 - \alpha$, and $w_k$ is a reliability associated with for a set of k motion vectors.

20. The system of claim 19, further comprising:
means for receiving the first and second frames, and
means for displaying the third frame between the first and second frames.

21. The system of claim 19, wherein the processing means is configured to identify motion vectors associated with portions of the first frame spatially proximal to a portion of the first frame corresponding to the generated portion of the third frame.

22. The system of claim 19, wherein the processing means is configured to iteratively assign each of the plurality of motion vectors to one of the plurality of clusters.

23. The system of claim 22, wherein the processing means is configured to:
assign each of the plurality of motion vectors to one of the clusters;

calculate the centroid of each of the clusters; and determine whether the centroid of each cluster has changed from a prior iteration by less than a predetermined threshold.

24. The system of claim 23, wherein the processing means is configured to:

assign each of the plurality of motion vectors based on a distance to the centroid of each cluster; and select the at least one motion vector assigned to each of the plurality of clusters by selecting the at least one motion vector closest to the centroid of each cluster.

25. The system of claim 22, wherein the processing means configured to generate at least one block of the third frame based on the at least one motion vector selected for each of the plurality of clusters.

* * * * *